(12) United States Patent
Vosshall et al.

(10) Patent No.: US 10,616,372 B2
(45) Date of Patent: *Apr. 7, 2020

(54) SERVICE REQUEST MANAGEMENT

(71) Applicant: Amazon Technologies, Inc., Reno, NV (US)

(72) Inventors: Peter S. Vosshall, Bainbridge Island, WA (US); Aaron C. Thompson, Seattle, WA (US); Dan Mihai Dumitriu, Hopewell, NJ (US); Ozgun A. Erdogan, Seattle, WA (US); Werner H. P. Vogels, Bellevue, WA (US); George A. Borle, Seattle, WA (US); Mathew Mills, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/178,410

(22) Filed: Jun. 9, 2016

(65) Prior Publication Data

US 2016/0294978 A1 Oct. 6, 2016

Related U.S. Application Data

(63) Continuation of application No. 13/942,498, filed on Jul. 15, 2013, now Pat. No. 9,379,997, which is a (Continued)

(51) Int. Cl.
*H04L 29/08* (2006.01)
*H04L 29/06* (2006.01)
*H04L 12/28* (2006.01)
*H04L 12/911* (2013.01)
*H04L 12/917* (2013.01)

(52) U.S. Cl.
CPC .......... *H04L 67/327* (2013.01); *H04L 12/287* (2013.01); *H04L 12/2869* (2013.01); (Continued)

(58) Field of Classification Search
None
See application file for complete search history.

(56) References Cited

U.S. PATENT DOCUMENTS 6,324,582 B1 11/2001 Sridhar et al.
6,449,648 B1 9/2002 Waldo et al.
(Continued)

OTHER PUBLICATIONS

Colajanni et al., "Dynamic Load Balancing in Geographically Distributed Heterogeneous Web Servers," in *Proceedings of the International Conference on Distributed Computing Systems*, May 26-29, 1998, pp. 295-302.

*Primary Examiner* — Shirley X Zhang
(74) *Attorney, Agent, or Firm* — Robert C. Kowert; Kowert, Hood, Munyon, Rankin & Goetzel, P.C.

(57) ABSTRACT

A computer-implemented system and method for managing service requests are disclosed. The system includes a service provider, having a number of server devices, that provides a service response in response to a client service request. The service response includes a service instance ID associated with a server and a connection lease. A communication processing component routes a first client service request to one of the servers. Subsequent client service requests and responses are transmitted directly between the client device and the server device associated with service instance ID included in the first service response for the duration of the connection lease.

25 Claims, 3 Drawing Sheets

Related U.S. Application Data continuation of application No. 13/472,199, filed on May 15, 2012, now Pat. No. 8,495,170, which is a continuation of application No. 11/771,965, filed on Jun. 29, 2007, now Pat. No. 8,260,940.

(52) U.S. Cl.
CPC ............ *H04L 47/76* (2013.01); *H04L 47/781* (2013.01); *H04L 47/826* (2013.01); *H04L 67/1002* (2013.01); *H04L 67/16* (2013.01); *H04L 67/42* (2013.01)

(56) References Cited

U.S. PATENT DOCUMENTS

| | | |
|---|---|---|
| 6,779,017 B1 | 8/2004 | Lamberton et al. |
| 6,950,874 B2 | 9/2005 | Chang et al. |
| 7,003,575 B2 * | 2/2006 | Ikonen ................... H04L 29/06 709/226 |
| 7,203,764 B2 | 4/2007 | Jorgenson |
| 7,320,131 B1 | 1/2008 | O'Toole, Jr. |
| 7,441,045 B2 | 10/2008 | Skene et al. |
| 7,512,707 B1 | 3/2009 | Manapragada et al. |
| 7,552,237 B2 | 6/2009 | Cernohous et al. |
| 7,774,782 B1 * | 8/2010 | Popescu ................. G06F 9/505 709/202 |
| 2002/0040400 A1 | 4/2002 | Masters |
| 2003/0051042 A1 | 3/2003 | Tazoe |
| 2004/0260745 A1 | 12/2004 | Gage et al. |
| 2005/0021848 A1 | 1/2005 | Jorgenson |
| 2005/0050202 A1 | 3/2005 | Aiken, Jr. et al. |
| 2005/0078668 A1 * | 4/2005 | Wittenberg ......... H04L 12/2856 370/389 |
| 2006/0242300 A1 * | 10/2006 | Yumoto ............ H04L 29/06027 709/226 |

\* cited by examiner

SERVICE REQUEST MANAGEMENT

CROSS-REFERENCE TO RELATED APPLICATIONS

This application is a continuation of co-pending U.S. patent application Ser. No. 13/942,498, filed Jul. 15, 2013 and entitled "Service Request Management", which is hereby incorporated by reference in its entirety. U.S. patent application Ser. No. 13/942,498 is a continuation of U.S. patent application Ser. No. 13/472,199, filed May 15, 2012 and entitled "Service Request Management", now U.S. Pat. No. 8,495,170. U.S. patent application Ser. No. 13/472,199 is a continuation of U.S. patent application Ser. No. 11/771,965, filed Jun. 29, 2007 and entitled "Service Request Management," now U.S. Pat. No. 8,260,940, which is hereby incorporated by reference in its entirety.

BACKGROUND

The ubiquity of computers in business, government, and private homes has resulted in the availability of massive amounts of information from network-connected sources, such as data stores accessible through communication networks. In recent years, computer communication and search tools have become widely available to facilitate the location and availability of information to users. Most computer communication and search tools implement a client-server architecture, where a user client computer communicates with a service provider via a remote server computer over a communication network.

One approach to increasing service provider communication bandwidths relates to employing multiple network server computers offering the same services. These server computers may be arranged in server farms, in which a single server from the server farm receives and processes a particular request from a client computer. Typically, server farms implement some type of load balancing algorithm to distribute requests from client computers among the multiple servers. Generally described, in a typical client-server computing environment, client devices generally issue requests to server devices for some kind of service and/or processing, and the server devices process those requests and return suitable results to the client devices. In an environment where multiple clients send requests to multiple servers, workload distribution among the servers significantly affects the quality of service that the client devices receive from the servers.

Central control of load balancing typically requires a dedicated hardware controller, such as a master server, to keep track of all servers and their respective loads at all times. Alternatively, the central communication processing component may be a communication processing device that uses a simple algorithm, such as a round-robin load distribution algorithm, to distribute client requests over several servers. The communication load resulting from client requests affects not only the servers that serve the client requests, but also the hardware communication processing components which have to route the client requests. Because the communication loads affect the communication processing components, an efficient and effective load balancing solution must take into account the load imposed on hardware load balancing components, as well as the servers which service client requests.

One approach is to use a server locator service (SLS) for handling client requests. In this approach, the client request is directed to a well-known name or internet protocol (IP) address for service. The communication processing component queries SLS services running on multiple servers to locate a server to service the client request. The communication processing component is actually distributing the communication load over the SLS services and not the services requested by the client computing device. Once a host is located, the host name is returned to the client computing device for further client service requests. In this approach, the first client request is a discovery request which, as noted above, is directed to the SLS services running on the servers. Discovery requests do not include data requests and are only used to locate servers. Such discovery requests are out-of-band communications, meaning that discovery requests do not pass through the same logical communication channels as data requests. Out-of-band communication incurs certain overhead costs, such as additional communication related to the discovery packets which do not contribute to transmission of data.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
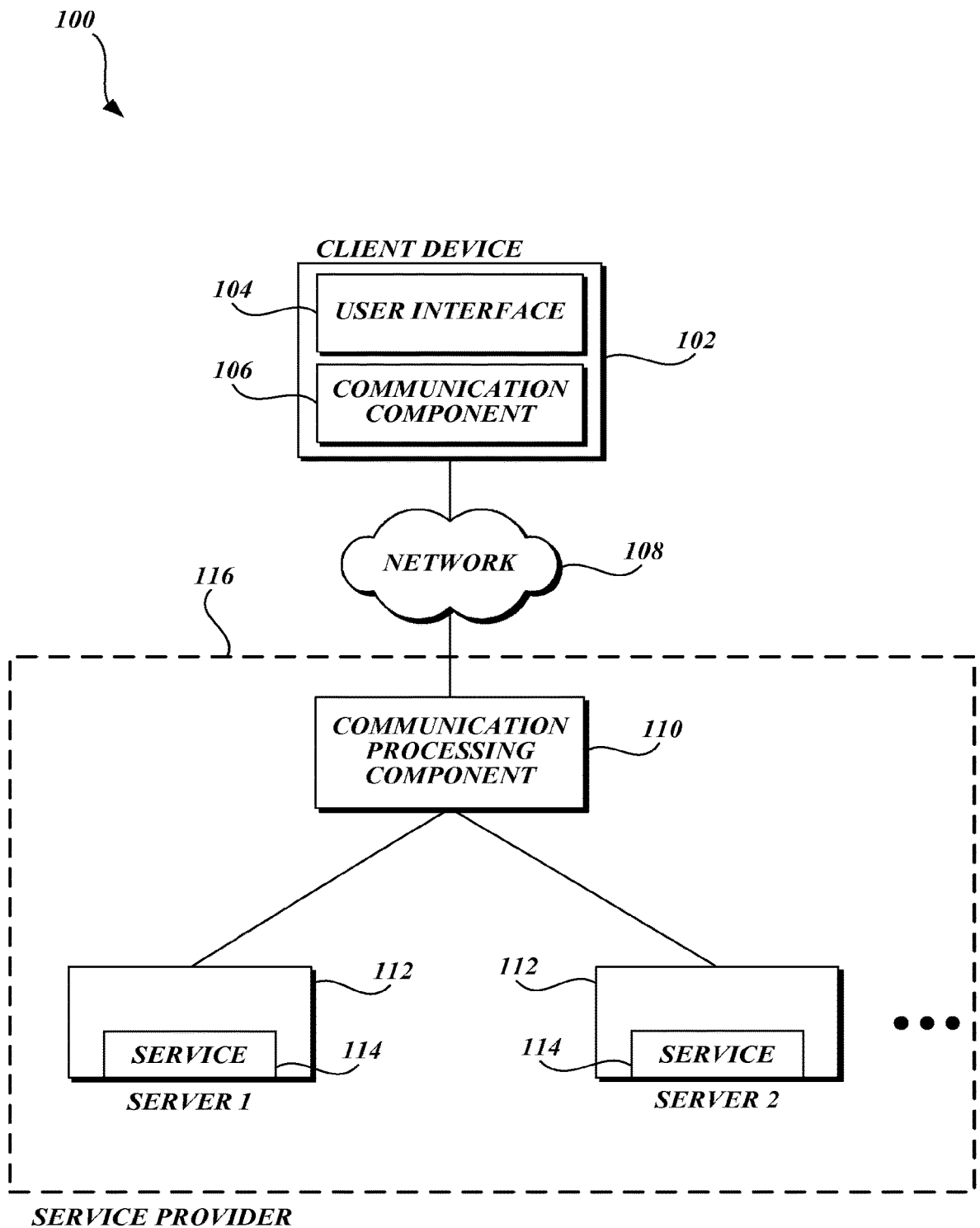
FIG. 1 is a block diagram depicting an illustrative client-server operating environment suitable for hardware load balancing, including a client device and a number of server devices, in accordance with one or more embodiments.

The following detailed description describes illustrative embodiments of the invention. Although specific operating environments, system configurations, user interfaces, and flow diagrams may be illustrated and/or described, it should be understood that the examples provided are not exhaustive and do not limit the invention to the precise forms and embodiments disclosed. Persons skilled in the field of computer programming will recognize that the components and process elements described herein may be interchangeable with other components or elements or combinations of components or elements and still achieve the benefits and advantages of the invention. Although the present description may refer to the Internet, persons skilled in the art will recognize that other network environments that include local area networks (LAN), wide area networks (WAN), and/or wired or wireless networks, may also be suitable.

Prior to discussing the details of the invention, it will be appreciated by those skilled in the art that the following description is presented largely in terms of logic operations that may be performed by conventional computer components. These computer components, which may be grouped in a single location or distributed over a wide area, generally include computer processors, memory storage devices, display devices, input devices, etc. In circumstances where the computer components are distributed, the computer components are accessible to the each other via communication links.

In the following descriptions, numerous specific details are set forth in order to provide a thorough understanding of the invention. However, it will be apparent to one skilled in the art that the invention may be practiced without some or all of these specific details. In other instances, well-known process elements have not been described in detail in order not to unnecessarily obscure the invention.

Generally described, the invention relates to client request load balancing in a client-server computing environment. Specifically, the invention relates to the balancing of server load using hardware communication processing component and server assignments for subsequent service requests. In accordance with an illustrative embodiment of the invention, a client device initially transmits a first data request that is handled by a communication processing component. The communication processing component routes the client's request to a server based on some load balancing algorithm. In an illustrative embodiment, the load balancing algorithm can correspond to a round-robin method for sequentially selecting servers, a random (or pseudo-random) selection method, a load-based selection method, and the like. In addition to the appropriate response from the client request (e.g., requested data or acknowledgement), the server returns a service response including the data requested from the client, if any, a service instance ID (which may be associated with server device), and a connection lease. Once the client device has the information returned from the server, namely, the service instance ID and the connection lease, the client device sends subsequent service requests to the server directly, bypassing the communication processing component for the duration of the connection lease.

FIG. 1 is a block diagram depicting a sample client-server operating environment 100 suitable for central load balancing. Client devices 102 are coupled to a communication processing component 110 via network 108. In one illustrative embodiment, the communication processing component 110 is a hardware load balancing controller. In another illustrative embodiment, the communication processing component 110 is implemented as a software component. In one illustrative embodiment, the network 108 is the Internet and the client devices 102 communicate with the server devices 112 via Web protocols, such as the Hypertext Transport Protocol (HTTP). In this embodiment, the servers 112 may be Web servers arranged in a server farm accessible through the same Uniform Resource Identifier (URI). The client device 102 typically includes a user interface 104 and a communication component 106. In the embodiment discussed above, the user interface is typically a Web browser, having an added load balancing support component, for example, a plug-in, which is used to interact with the user. In this embodiment, the load balancing support component uses the service instance ID and connection lease for routing the client service requests directly to the server associated with the service instance ID. The server device 112 typically includes many services 114 which handle client service requests for a particular service. Each service 114 may be associated with a service instance identifier. In one embodiment, the service instance identifier may be associated with a specific server device 112. In another embodiment, the service instance identifier may be associated with the service 114 irrespective of a particular server device 112. For example, the service 114 may be a Web server that serves Web pages in response to client requests. Other services 114 that may be offered by servers 112 include File Transport Protocol (FTP), database access services, file access services, application services, etc. Those skilled in the art will appreciate that several instances of a service 114 may simultaneously run on the same server device 112, each service instance having a unique service instance ID to distinguish one service from others.

In an illustrative embodiment, the client service requests may include requests for data, such as Web pages, to be returned to the client 102 by the server 112. The client service request may also indicate a request to perform some process or task at the server 112, such as a registration or a data update at the server 112, without returning any data. In all cases, however, the server 112 processes the service request from the client 102. Client devices may include, but are not limited to, a personal computer, a personal digital assistant (PDA), a mobile phone device, etc. As noted above, the network 108 may include the Internet, a corporate LAN, or a WAN.

In one illustrative embodiment, the client device 102 may include a communication component 106 that processes the information returned from the server 112 encapsulated in a service response, including the service instance ID and the connection lease. In another illustrative embodiment, the client component that handles the service response from the server 112 may be separate from the communication component 106 which handles only data transmission to and from the network 108. In another illustrative embodiment, the client communication component may be integrated with another software component running on the client device 102. For example, the client device 102 may include a plug-in component integrated with the Web browser running on the client device 102 for handling data related to the service routing process, such as a service instance ID and the connection lease.

Although the above descriptions and the detailed descriptions that follow may refer to a single client and two servers, it will be appreciated by those skilled in the art that the present invention is not limited to a single client or two servers, but is equally applicable to any number of client and server machines/components. Additionally, even though the following descriptions may refer to the Web and Web-based protocols, those skilled in the art will appreciate that the techniques and systems described are equally applicable to other types of computing environments, such as LANs and WANs.

Figure 2:
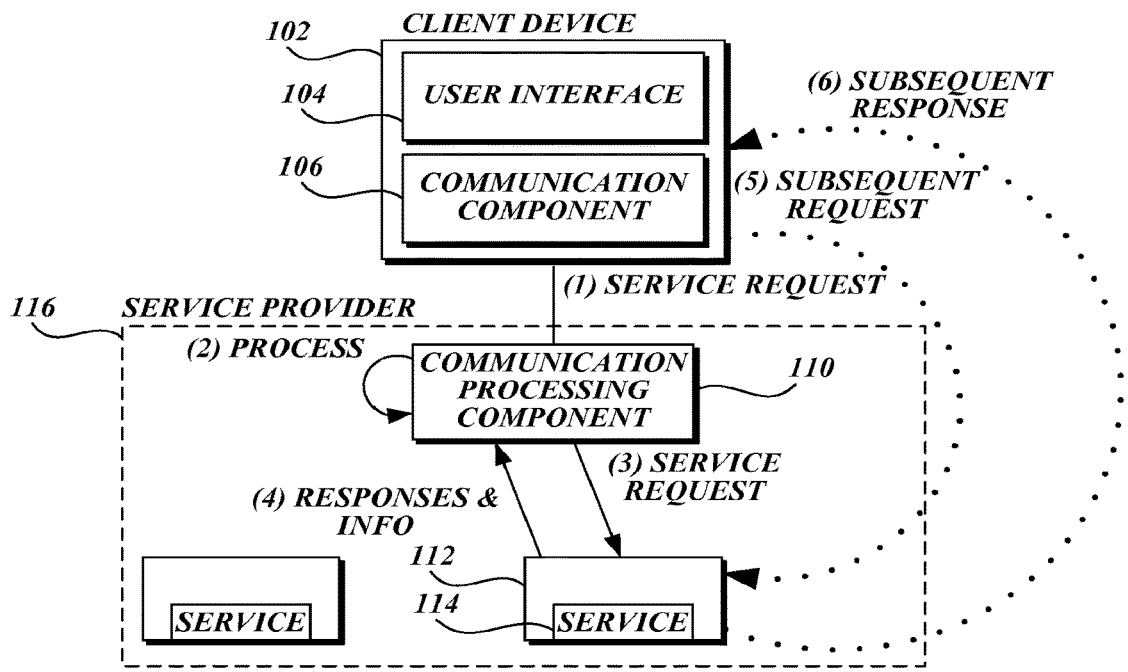
FIG. 2 is a block diagram of the client-server operating environment of FIG. 1 illustrating a client request and server response process, in accordance with one or more embodiments.

FIG. 2 is a block diagram of the client-server operating environment of FIG. 1 illustrating the request-response process in accordance with one aspect of the present invention. In this illustrative embodiment, the client device 102 transmits a first client service request which is handled by the communication processing component 110. As briefly noted above, the communication processing component 110 may be a full server computer implementing sophisticated load balancing algorithms based on multiple parameters indicating server load. The communication processing component 110 may be an intelligent switch implementing a simple algorithm for load balancing, such as a round-robin load distribution method. The communication processing component 110 may use a number of selection methods in selecting the next server for receiving the client service request. For example, the selection method may include a random selection, a probabilistic selection, a weighted probabilistic server selection, and the like. For example, in a weighted probabilistic server selection algorithm, a probability of selection to each server device 112 based on a server load is calculated based on reported server loads/resources. The probability is inversely proportional to the server load. The server load may be indicated by different parameters, such as server processing load measured by the number of processes waiting to be executed on the server, the number of clients currently being served by the server, the average latency between a client service request and the service response, etc.

Once the server 112 is selected by the communication processing component 110, the first client service request is forwarded to the server 112. The service 114 running on the server 112 processes the first client service request and returns a first service response to the client device 102. In one illustrative embodiment, the first service response is returned to the client device 102 via the communication processing component 110. In another illustrative embodiment, the first service response is returned directly to the client device 102. The service response may include any data requested by the client service request, a service instance ID identifying the server 112 and/or service 114 servicing the client service request, and a connection lease indicating a duration of a direct communication channel between the server 112 and the client device 102. In one illustrative embodiment, the service instance ID is assigned by a distributed messaging system. The distributed messaging system may include messaging components running as background services on server devices 112. The messaging components communicate using a distributed protocol to assign service instance IDs to services 114 and to route incoming requests to an identified service 114 running on an appropriate device currently hosting the identified service 114. As instances of services 114 are added or deleted from the servers 112, the service instance IDs are updated accordingly.

The connection lease may be based on a number of parameters, such as time, a number of client service requests, an amount of data transmitted, or any combination of these parameters. For example, the connection lease may be valid for a fixed time duration, such as 100 milliseconds. Alternatively, the connection lease may be based on the number of client service requests. For example, the connection lease time may be valid for a fixed number of client service requests, such as 1000 service requests. Similarly, the connection lease may be valid for a fixed amount of data, such as 10 MB of transmitted data. In an illustrative embodiment, the lease information may be directly transmitted from server. Alternatively, the lease information may be indirectly referenced to information already stored on the client machine. For example, the server may reference a table of lease terms that is pre-stored on a client device 102. Those skilled in the art will appreciate that the connection lease may be based on many other parameters or combination of parameters without departing from the spirit of the present disclosures.

Depending on the type of service requested by the client device 102, the service response may or may not include any data. For example, if the client service request is transmitted to the server 112 in order to initiate some action or task, then the service response will not include any data. Once the client device 102 receives the service response back from the server 112, the client device 102 can directly communicate with the server 112 using the service instance ID for the duration of the connection lease. Therefore, subsequent client service requests and service responses are communicated directly between the client device 102 and the server device 112, bypassing the communication processing component 110 for the duration of the connection lease.

The connection lease may be terminated by the client device 102 or the server device 112 for various reasons. For example, if the server device determines that it is overloaded with client service requests, then the server 112 may terminate the connection lease. In such case, the process of discovery starts over again. That is, the client device 102 will send another first client service request to the communication processing component 110 to be forwarded to another server 112. Another reason for breaking the connection lease by the server device 112 is a failure in some aspect of the service 114. For example, if the service 114 is the interface to a database from which the client device 102 has requested some data, and the database is inaccessible, then the server 112 may break the connection lease. In one illustrative embodiment, the breaking of a connection lease may be indicated to the client device 102 with a special error code embedded in the service response sent by the server 112 to the client device 102. In another illustrative embodiment, the breaking of the connection lease may be determined by the client device based on a time-out parameter. The server device 112 may also renegotiate or adjust the connection lease terms for substantially the same reasons discussed above with respect to lease termination. For example, if the server device 112 determines that the server load is increasing at a threshold rate, the server device may adjust the connection lease of one or more of the client devices 102 currently being serviced by the server device 112 in the next service response to shorten the term of the lease and reduce server load.

After termination of the connection lease, the client device 102 may wait a random amount of time before attempting to obtain a new connection lease from the communication processing component 110. This is to avoid overloading the communication processing component 110 in case of simultaneous multiple server device failures. Those skilled in the art will appreciate that there are many common methods to handle connection failures, such as retrying a predetermined number of times, waiting a random amount of time, obtaining a status of the server from an external source, performing exponential back-off, wherein the wait time is increased exponentially as a function of the number of previous retries and failures, and the like, before trying to connect again. Additionally, the client device 102 may attempt to continue to communicate with an identified server 112 and/or service 114 after termination if no alternate server/service can be identified.

The client device 102 may also terminate the connection lease for various reasons. For example, the communication component 106 may send multiple client service requests for discovery purposes to the communication processing component 110 and receive multiple service responses in response to the multiple client service requests. Next, the communication component 106 may compare the information included in the service responses returned from the different servers 112 to determine which server 112 could offer the best and/or most efficient service. In one illustrative embodiment, the service response may include additional information such as server load statistics, different types of services 114 offered by the server 112, and other information usable for selection of a server device 112. In this illustrative embodiment, the communication components 106 contribute significantly to overall load balancing by selecting the server 112. Such selection of server device 112 by the communication component 106 is above and beyond the server selection performed by the communication processing component 110. Therefore, in this embodiment, a layered approach is taken to load balancing with a first layer implemented by the use of the communication processing component 110 and the second layer on top of the first layer comprises further load balancing by the use of the communication components 106 based on the information provided by the service responses from servers 112.

Figure 3:
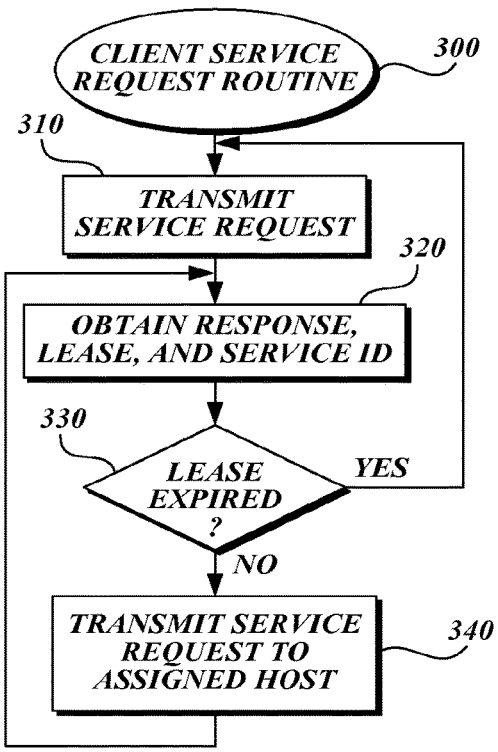
FIG. 3 is a flow diagram depicting an illustrative method of sending a request, in accordance with one or more embodiments.

FIG. 3 is a flow diagram depicting an illustrative method of sending a request by a client device 102. As discussed above, the client device 102 may send a service request to a server 112 initially through the communication processing component 110 and subsequently through a direct communication channel with the server 112. This method starts at block 300 and proceeds to block 310 where the client service request is transmitted to the communication processing component 110. The communication processing component 110 selects one of several available server devices 112 based on one of a variety of selection algorithms available, as discussed above with respect to FIG. 2. Once the server device 112 is selected, the client service request is forwarded to the selected server device 112. Thereafter, the service 114 processes the client service request and returns a service response to the client device 102 via the communication processing component 110. The service response includes at least a service instance ID and a connection lease.

At block 320, the communication component 106 of the client device 102 receives the service instance ID and the connection lease. In one illustrative embodiment, the client service request is an HTTP request and the service 114 is a Web server. In this embodiment, the service instance ID and the connection lease may be passed as part of the URI exchange between the client device 102 and the server device 112. Those skilled in the art will appreciate that there are many other ways to communicate information by transmitting data packets between a client and a server device. For example, applications, such as FTP, implemented using IP have their own specific protocols which may include various fields for the communication of different types of data, such as the service instance ID and the connection leases. At decision block 330, it is determined whether the connection lease has expired. If the connection lease has expired, the method proceeds back to block 310 where the client device 102 transmits a new client service request to the communication processing component 110 in order to select another server 112 to service the client service request. If the connection lease has not expired, the method proceeds to block 340 where subsequent client service requests are transmitted directly to the server 112 having, the service instance ID transmitted initially to the client device 102.

Figure 4:
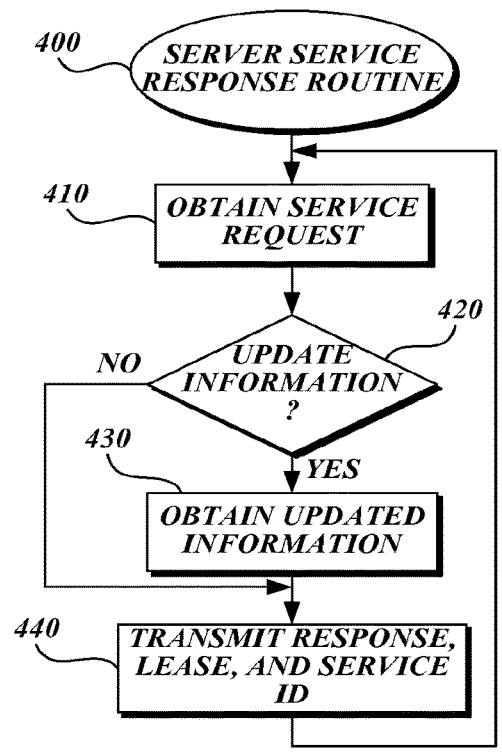
FIG. 4 is a flow diagram depicting an illustrative method for transmitting a service response, in accordance with one or more embodiments.

FIG. 4 is a flow diagram depicting an illustrative method for transmitting a service response to the client device 102 by the server device 112. As discussed above, the service response is sent to the client device 102 by the server 112 in response to a client service request. This method starts at block 400 and proceeds to block 410 where the client service request is obtained. As noted above, the client service request may include data requests, actions requests, or a combination of both. For example, in the case that the user interface 104 is a Web browser and the service 114 is a Web server, the service response comprises a Web page sent back to the client device 102. If the client service request is for an action to be performed by the service 114 without the need to send any data back to the client device 102, the service response only includes the service instance ID and the connection lease.

At decision block 420, the need for information updates is assessed. Information updates may include a different connection lease, an error condition, new data to be sent back to the client device 102, etc. As briefly discussed above, the server 112 may break the connection lease for various reasons including overloading of the server and/or an error condition such as loss of access to a database. If updated information is needed, updates are obtained at block 430 to be included in the service response. The updated information may be obtained from the server device 112, from other server devices, the communication processing component 110, or other sources of information. If no information update is required, the server 112 transmits the service response including the service instance ID and the connection lease at block 440. The method continues in a loop and goes back to block 410 to obtain the next service request from the client.

Figure 5:
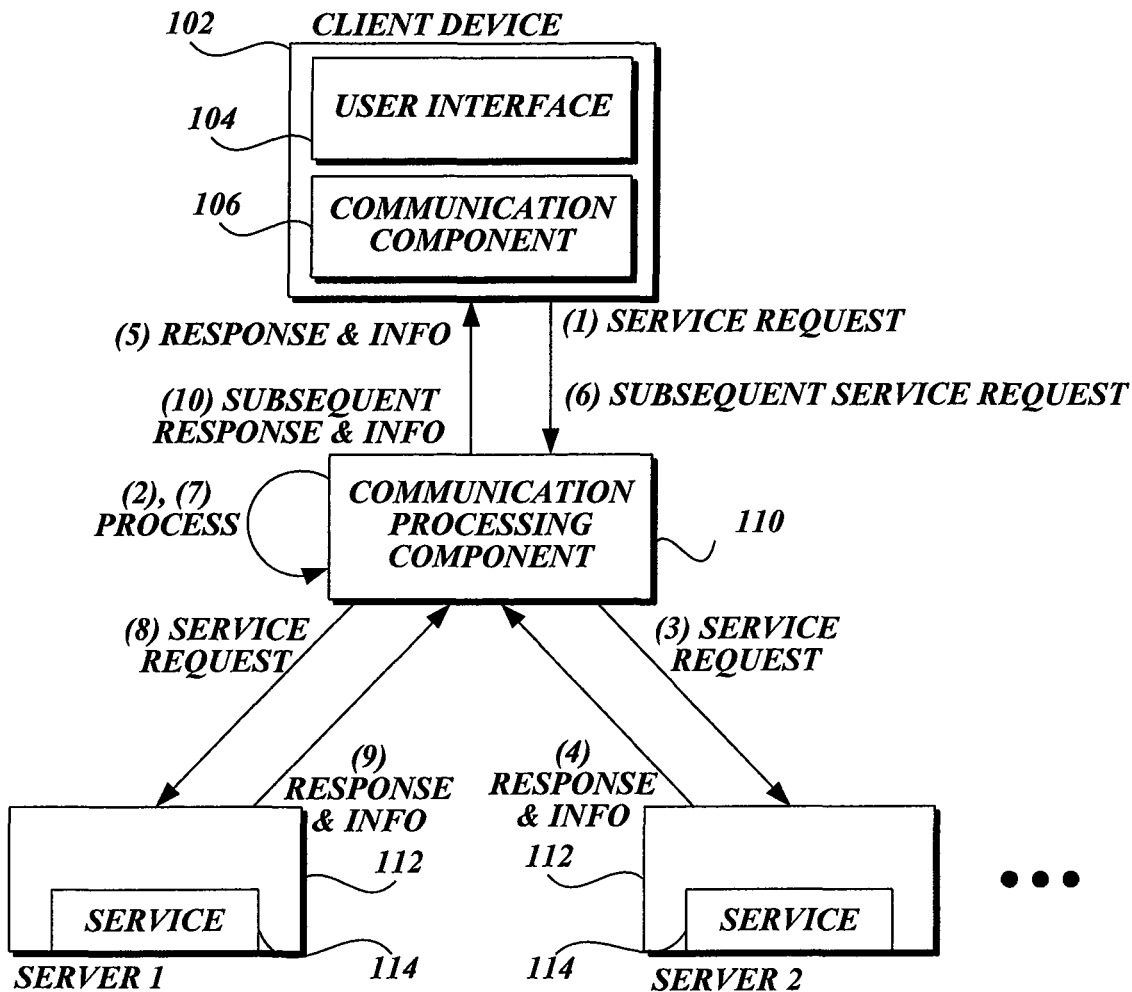
FIG. 5 is a block diagram of the client-server operating environment of FIG. 1 illustrating another illustrative embodiment of the request and response process.

FIG. 5 is a block diagram of the client-server operating environment of FIG. 1 illustrating another illustrative embodiment of the request and response process. As discussed above in an alternate embodiment, the communication components 106 may be used to implement a second layer of load balancing above and beyond the load balancing implemented by the communication processing component 110. In this embodiment, the communication components 106 compare information included in the service responses from different servers to determine which server offers the best service options for the client device 102. The client device 102 transmits a client service request to the communication processing component 110 which forwards the client service request to a selected server 112. In response, the server device 112 transmits a service response back to the client device 102 via the communication processing component 110. The service response includes the service instance ID, the connection lease, and other information usable to determine the quality of service and availability of the server device 112 to handle client service requests. Such additional information includes data on server 112 load statistics, current server processing and communication loads, and types of services 114 offered by the server device 112. Simultaneously, the client device 102 transmits other client server requests to the communication processing component 110 which are passed on to other servers 112. The other servers 112 respond to the client service requests via service responses, as described above. The communication component 106 keeps track of the various client service requests sent to the different servers 112 and the corresponding service responses received in response to such client service requests.

The communication component 106 determines which server 112 can best serve the client device 102 based on the information included in the service responses received from the various servers 112. Once a server device 112 is selected based on such comparison of service responses, the client device 102 transmits all subsequent client service requests to the selected server 112 for the duration of the connection lease. The communication component 106 may continue to send other client service requests through the communication processing component 110 to other server devices 112 in order to continually improve the quality of service received by the client device 102. If the communication component 106 finds a server 112 which can better serve the client device 102, then the client device 102 may break the connection lease with the server device 112 currently servicing the client device 102 and start direct communication with the new server device 112. The communication processing component 110 may use a number of selection methods in selecting the next server for receiving the client service request. For example, the selection method may include a random selection, a probabilistic selection, weighted probabilistic server selection, and the like. For example, in a weighted probabilistic server selection algorithm, a probability of selection to each server device 112 based on a server load is calculated based on reported server loads/resources. The probability is inversely proportional to the server load. The server load may be indicated by different parameters, such as server processing load measured by the number of processes waiting to be executed on the server, the number of clients currently being served by the server, the average latency between a client service request and the service response, etc.

While illustrative embodiments have been illustrated and described, it will be appreciated that various changes can be made therein without departing from the spirit and scope of the invention.

The invention claimed is:

1. A computer-implemented method, comprising:
   transmitting, by a client computing device, and to a load balancing component providing load balancing capabilities for a plurality of server devices that provide a service, a first request for discovery of one of the plurality of server devices to subsequently provide the service to the client computing device;
   receiving, by the client computing device and in response to the first request, a response that identifies a server device from the plurality and that includes information about a duration for a connection lease during which further requests for the service are allowed to be sent from the client computing device directly to the identified server device;
   transmitting, by the client computing device and during the duration, one or more additional requests for the service directly to the identified server device while bypassing the load balancing component, wherein the one or more additional requests include at least one of providing instructions to the service for one or more activities to perform or obtaining data from the service;
   responsive to a terminating of the connection lease before the duration is complete, determining, by the client computing device, a random or increased amount of time to wait after the terminating of the connection lease before transmitting a second request to the load balancing component for the service.

2. The computer-implemented method of claim 1 wherein the terminating of the connection lease is performed responsive to a determination that the identified server device is overloaded with client service requests.

3. The computer-implemented method of claim 1 wherein the terminating of the connection lease is performed responsive to a determination that a failure has occurred in the service.

4. The computer-implemented method of claim 1 wherein the receiving of the information about the duration includes receiving an indication of an amount of data for which the connection lease is valid.

5. The computer-implemented method of claim 1 wherein the receiving of the information about the duration includes receiving an indication of a quantity of requests for the service for which the connection lease is valid.

6. The computer-implemented method of claim 1 wherein the receiving of the information about the duration includes receiving an indication of an amount of time for the connection lease, and wherein the method further comprises tracking to determine when the amount of time is reached.

7. The computer-implemented method of claim 1 wherein the method further comprises:
   receiving, by the client computing device and during the duration, information from the identified server device to adjust the connection lease to shorten the duration of the connection lease.

8. The computer-implemented method of claim 1 wherein the terminating of the connection lease before the duration is complete is determined based on information received from at least one of the load balancing component or one of the plurality of server devices.

9. The computer-implemented method of claim 7 wherein the method further comprises determining an amount of time to wait to acquire a second connection lease that increases exponentially with a quantity of retry attempts, and wherein the transmitting of the second request is performed at a time based at least in part on the determined amount of time.

10. The computer-implemented method of claim 7 wherein the determining to terminate the connection lease is based at least in part on a failure that occurs with one or more server devices of the plurality.

11. A computer-implemented method comprising:
    transmitting, by a client computing device, and to a load balancing component that is separate from a plurality of server devices providing a service and is providing load balancing capabilities for the plurality of server devices, a first request for one of the plurality of server devices to subsequently provide the service for the client computing device:
    receiving, by the client computing device and in response to the first request, a response that identifies a server device from the plurality and that includes information about a first duration for a connection lease during which further requests for the service are sent from the client computing device directly to the identified server device;
    transmitting, by the client computing device and during the first duration, one or more additional requests for the service directly to the identified server device while bypassing the load balancing component;
    terminating the connection lease before the first duration is complete;
    determining, by the client computing device, a random amount of time to wait after the terminating of the connection lease before transmitting a second request to the load balancing component for the service; and
    receiving, by the client computing device, and after the transmitting the second request at a time based at least in part on the determined random amount of time, additional information about a selected server device from the plurality to which additional requests for the service are directly sent from the client computing device during a second duration.

12. A system, comprising:
    one or more computer processors; and
    one or more memories with software instructions that, when executed by the one or more computer processors, cause the system to:
        transmit, from the system, and for a service implemented using a plurality of server devices, a single first request over one or more computer networks to a device that is separate from and providing load balancing functionality for the plurality of server devices, wherein the first request is to discover one of the plurality of server devices to subsequently interact with the system for the service;
        receive, in response to the first request, a response that identifies a server device from the plurality and that includes information about a duration for a connection lease during which further requests for the service are allowed to be sent from the system directly to the identified server device;

transmit, by the system and during the duration, one or more additional requests for the service directly to the identified server device to bypass the device associated with the service;

responsive to termination of the connection lease before the duration is complete, determine, by the system, a random or increased amount of time to wait after the termination of the connection lease before transmitting a second request to the device associated with the service.

13. The system of claim 12 wherein the receiving of the information about the duration includes receiving an indication of an amount of time for the connection lease, and wherein the software instructions further cause the system to determine when the amount of time is reached.

14. The system of claim 12 wherein the receiving of the information about the duration includes receiving an indication of an amount of data for which the connection lease is valid.

15. The system of claim 12 wherein the termination of the connection lease is performed responsive to a determination that a failure has occurred in the service.

16. The system of claim 12 wherein the termination of the connection lease is performed responsive to a determination that the identified server device is overloaded with client service requests.

17. The system of claim 14 wherein the determining to terminate the connection lease is based at least in part on a failure that occurs in interacting over the one or more computer networks with one or more server devices of the plurality.

18. The system of claim 12 wherein the transmitting of the one or more additional requests include at least one of requesting data from the service or providing instructions to the service for one or more activities to perform.

19. A system comprising:
one or more computer processors; and
one or more memories with software instructions that, when executed by the one or more computer processors, cause the system to at least:
transmit, over one or more computer networks, and from the system to a device that is separate from a plurality of server devices associated with a service and is providing load balancing functionality for the service, a first request for one of the plurality of server devices to subsequently provide the service;
receive, in response to the first request, a response that identifies a server device from the plurality and that includes information about a first duration for a connection lease during which further requests for the service are sent directly to the identified server device;
transmit, during the first duration, one or more additional requests for the service directly to the identified server device to bypass the device providing the load balancing functionality;
determine, after the connection lease is terminated before the first duration is complete, one or more amounts of time to wait to acquire an additional connection lease, wherein the one or more amounts of time increase exponentially with a quantity of retry attempts;
transmitting, at one or more increasing times based at least in part on the determined one or more amounts of time, one or more second requests for the additional connection lease to the device providing the load balancing functionality; and receive, in response to the one or more second requests, information about a selected server device from the plurality to which other requests for the service are directly sent during a second duration for the additional connection lease.

20. A computer-implemented method, comprising:
receiving, from a client computing device, and by a load balancing component associated with and separate from a plurality of server devices that provide a service, a first request for discovery of one of the plurality of server devices to subsequently provide the service to the client computing device;

determining, in response to the first request, a server device identified from the plurality to provide the service to the client computing device, and a duration for a connection lease during which further requests from the client computing device for the service are allowed to be sent directly to the identified server device;

transmitting, to the client computing device, a response that indicates the identified server device and the duration, to cause one or more additional requests for the service from the client computing device during the duration to be sent directly to the identified server device;

determining, by the identified server device, that identified server device is overloaded with client service requests; and transmitting, to the client computing device, another service response indicating to shorten the duration of the connection lease.

21. The computer-implemented method of claim 20 further comprising:
receiving, by the identified server device and from the client computing device, the one or more additional requests for the service during the duration, wherein the one or more additional requests are sent directly to the identified server device while bypassing the load balancing component; and transmitting, by the identified server device and to the client computing device, one or more responses to the one or more additional requests.

22. The computer-implemented method of claim 20 further comprising selecting the identified server device in response to the first request, and wherein the transmitting of the response to the client computing device is performed by the identified server device.

23. The computer-implemented method of claim 22 wherein the determining of the duration is performed by the identified server device.

24. The computer-implemented method of claim 20 wherein the transmitting of the response to the client computing device is performed by the load balancing component.

25. The computer-implemented method of claim 24 wherein the determining of the duration is performed at least in part by the load balancing component and includes identifying the server device from the plurality.

* * * * *